Sept. 13, 1966 J. JELES 3,272,513

RECORD PLAYER

Filed Sept. 17, 1963 3 Sheets-Sheet 1

INVENTOR
JOSEPH JELES
BY
Fetherstonhaugh & Co.
ATTORNEYS

Sept. 13, 1966 J. JELES 3,272,513

RECORD PLAYER

Filed Sept. 17, 1963 3 Sheets-Sheet 2

INVENTOR
JOSEPH JELES
BY
Fetherstonhaugh & Co.
ATTORNEYS

INVENTOR
JOSEPH JELES
BY
Fetherstonhaugh & Co.
ATTORNEYS 3,272,513
Patented Sept. 13, 1966

3,272,513

RECORD PLAYER

Joseph Jeles, 9910 Croft St.,
Chemainus, British Columbia, Canada

Filed Sept. 17, 1963, Ser. No. 309,546
16 Claims. (Cl. 274—13)

This invention relates to a record player in which the tone arm and the turntable are movable laterally relative to each other, the degree and relative lateral velocity being adjustable to retain the tone arm in constant tangential disposition to the record as the stylus carried by the tone arm and following the groove, moves across the face of the record.

In the description following and claims herein, the record referred to is the standard type having a sound modulated groove spiralling inward from a point near the periphery of the record towards its center.

In the recording of sound, a recording chisel is employed which is usually mechanically moved along a radius of a record, as the record rotates, the direction of force therefore of the chisel with respect to the record is always tangential to the record and the sideways movement of the chisel as it responds to sound vibrations are in a direction normal to the tangent at any point in its traverse across the face of the record. The chisel employed is a V-shaped chisel, with sharp cutting edges on the sides which indent the sides of the grooves. These indentations serve to vibrate the reproducing stylus, the vibrations being magnified by standard electrical components and emitted to a suitable speaker.

In the usual sound reproducing equipment, the record is rotatably supported on a rotatable turntable which has a fixed pivot and the reproducing stylus is carried at the end of a fixedly pivoted tone arm. It will be seen, therefore, that as the stylus follows the spiral groove from the outer peripheral edge of the record towards the center, the tone arm will pivot on its pivotal axis. However, the stylus will describe an arcuate path on the face of the record. It will be seen that the tone arm can only be exactly tangential to the spiral groove at two points at the most. Between these two points and outside these points, the tone arm is at some other angular disposition to the spiral groove, the angle between its tangential position and said other angular disposition being called as tracking angle error.

It will be appreciated that when the tone arm does not lie absolutely tangentially to the spiral groove in the record, one side or other of the stylus will bear more heavily on one side of the spiral groove that it will on the other. Where the recording chisel has recorded sound of high intensity, the amplitude of lateral and/or vertical vibration of the stylus is relatively large. This will, therefore, tend to cause the stylus to jump out of the groove where it is not exactly tangentially disposed thereto.

It will also be appreciated that if the reproducing stylus can be vibrated exactly as was the recording chisel, we will then have an exact reproduction of sound. This is not possible in record players where the tone arm is not always exactly tangential to the spiral sound track as the tracking angle error precludes the use of a reproducing stylus which is of the same or similar shape as the recording chisel. The stylus usually employed is circular in horizontal cross section and therefore a certain degree of fidelity is lost in the reproduction of sound.

It is appreciated that certain record players have been devised whereby either the tone arm or turntable are movable laterally with respect to each other in order to eliminate the tracking angle error by allowing the tone arm to remain more or less tangential to the spiral groove. However, such record players have always been confronted with the problem of changing lateral speed where more than one selection is reproduced on one face of the record. In common parlance, this type of record is known as the long playing record and has a number of selections which are grooved consecutively across the face of the record. The sound modulated portion of the spiral groove usually has very close groove spacing. However, the groove spacing is considerably widened between the end of one selection and the beginning of the other. Thus, where a laterally movable turntable or tone arm is set to the lateral velocity of the stylus across the modulated grooves of one record it may play with the tone arm in perfect tangency during one selection. However, due to the increased groove spacing between selections and the increased lateral velocity of the stylus, the tone arm will move out of its perfect position of perfect tangency. The problem also exists where modulated groove spacing varies between one record and another.

The present invention provides a record player in which the tone arm will always assume a position whereby the direction of movement of the spiral modulated groove at the point of the stylus will always be tangential to the tone arm on which the stylus is carried regardless of variation in groove spacing between two selections.

The present invention comprises a record player for playing spirally grooved records comprising a rotatable record carrying member, a stylus carrying, pivotally mounted arm member normally extending substantially tangentially to the record carrying member, and means actuated by movements of the arm member as the latter tends to shift out of its normal position as a result of lateral movement of the stylus relative to the record to move one of the members to maintain said arm member in its normal position.

In the drawings which illustrate the invention,

Figures 6, 7, 8, 10:
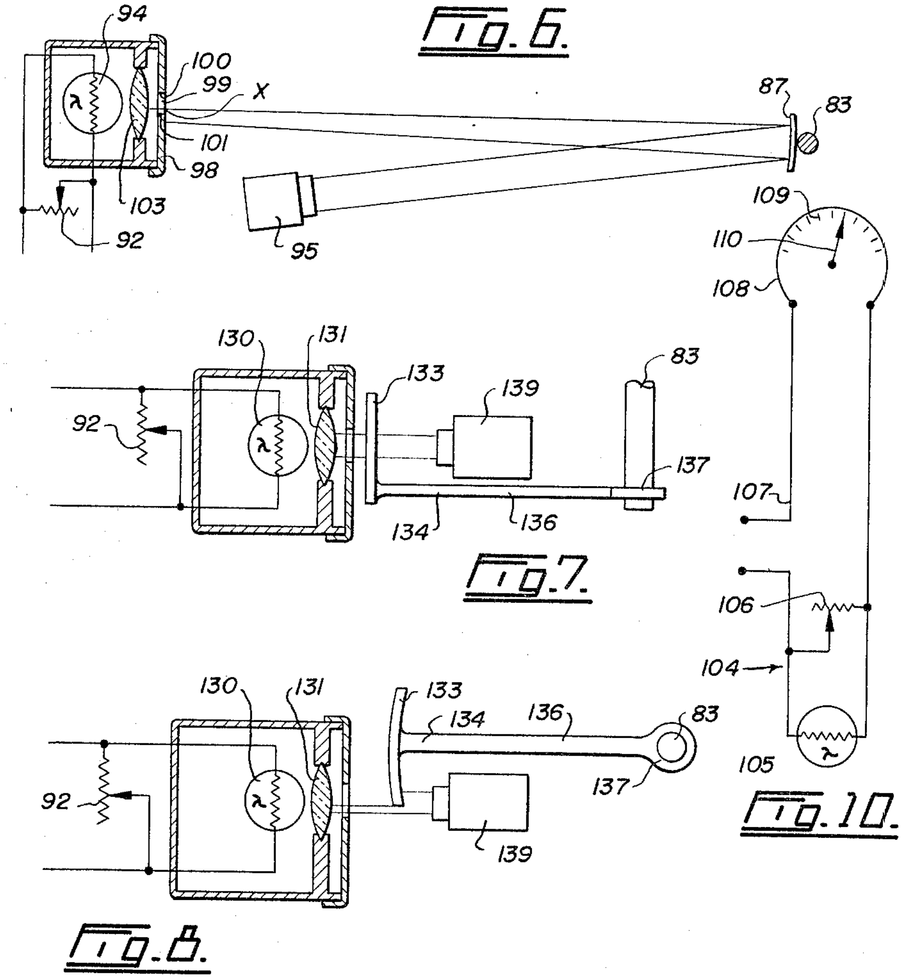
Figure 9:
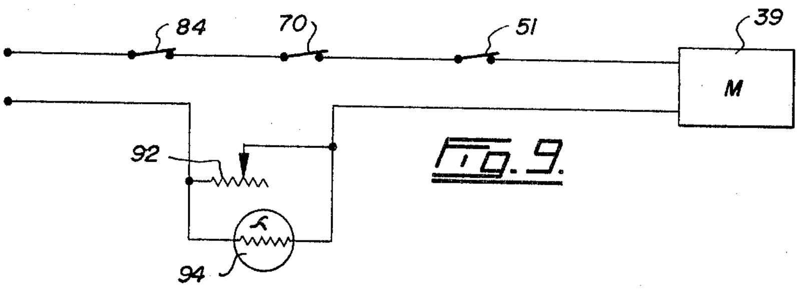

FIGURE 6 is a diagrammatic representation in plan of the action of the light dependent resistor and means of operation thereof, FIGURE 7 is another diagrammatic representation in elevation of an alternate form of light dependent resistor, FIGURE 8 is a diagrammatic representation in plan of the embodiments of the invention, as shown in FIGURE 7, FIGURE 9 is a wiring diagram showing in diagrammatic representation the components of the apparatus, and FIGURE 10 is a wiring diagram showing in diagrammatic representation apparatus to measure the amount of current flow through a light dependent resistor 105.

Figure 1:
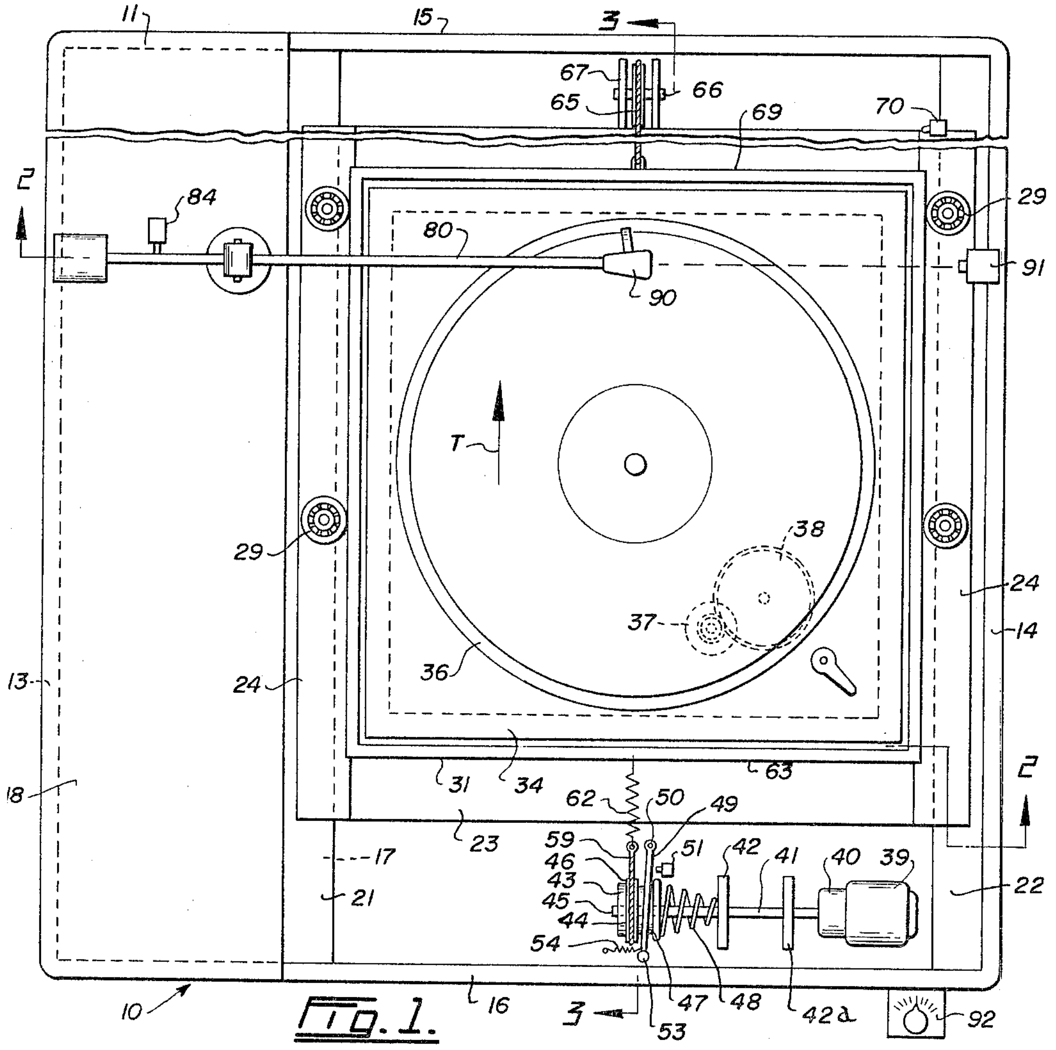
FIGURE 1 is a plan view of one embodiment of the invention.
Figure 2:
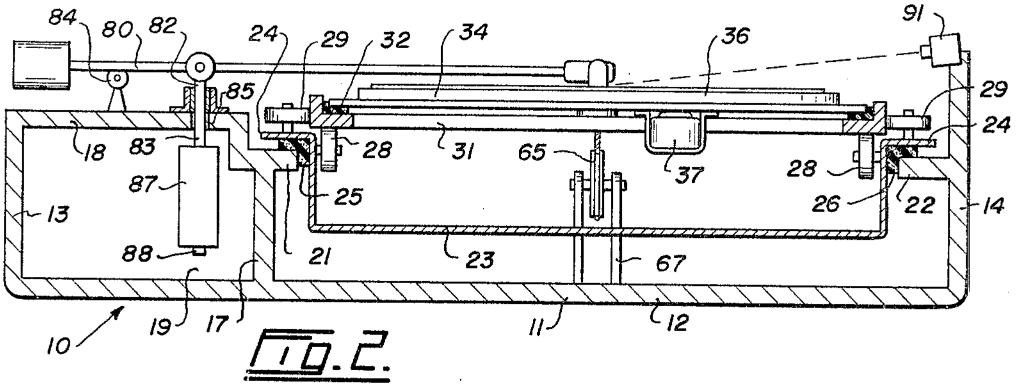
FIGURE 2 is a section taken along line 2—2 of FIGURE 1.
Figure 3:
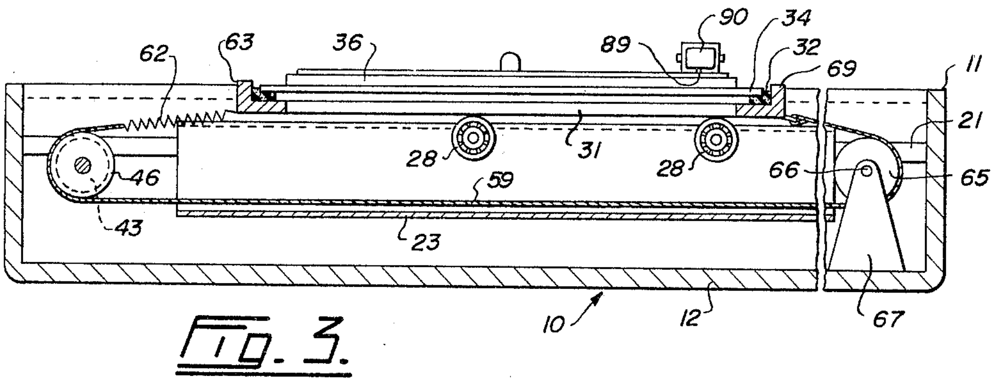
FIGURE 3 is a section taken along line 3—3 of FIGURE 1.

Referring now to the drawings and with specific reference to FIGURES 1, 2 and 3, which illustrate one form of the invention, the record player 10 comprises a cabinet 11 which is formed having a bottom wall 12, side walls 13 and 14, end walls 15 and 16, a central wall or partition 17 and a cover 18 extending between side wall 13 and center wall 17 to form a chamber 19. The cabinet may be made of any suitable material, such as selected wood or the like.

Center wall 17 and side wall 14 are each provided with longitudinal ribs 21 and 22, respectively, and mounted therebetween is a supporting base 23 which is provided with outwardly projecting flanges 24 arranged to rest on ribs 21 and 22. Rubber strips 25 and 26 are interposed between the aforesaid ribs and flanges to reduce the effect of vibration on the record player produced by any movement of the parts in a manner as hereinafter described.

A plurality of aligned vertical 28 and horizontal 29 rollers carried by the supporting base 23 serve as rolling support and rolling horizontal guidance for a carriage 31, said carriage being composed of four channel members suitably connected to form a rectangular framework supporting on rubber mounts 32 a turntable base plate 34. A turntable 36 is mounted for rotation centrally of the base plate in a manner now standard in the manufacture of record players and the like. In the record player as shown in FIGURES 1, 2 and 3, a small electric motor 37 capable of adjustment to various record speeds, is mounted underneath the turntable base plate 34 and is arranged to drive an idler wheel 38 which engages the rim of the turntable 36 in a manner now standard for record players.

The carriage 31 is slidably moved by means of a variable speed electric motor 39 which is mounted on the bottom 12 of the cabinet 11 and operates through a train of gears 40 to rotate a drive shaft 41 which is supported for rotation in bearing blocks 42 and 42*a* upstanding from the bottom 12 of the cabinet 11. A fly wheel 43 having a friction face 44 is mounted for rotation on one end 45 of the shaft 41 and also mounted on the shaft co-axially with the drive wheel is a drive pulley 46, said drive pulley being freely rotatable on the shaft and longitudinally slidable thereto. An annular pressure plate 47 mounted co-axially on the shaft in the same manner as the drive pulley, is normally urged against the drive pulley by the action of a compression spring 48 situated over the shaft between bearing block 42 and the aforesaid pressure plate. A lever 49 pivotally connected to the cabinet at one end 50 is arranged adjacent the pressure plate so that the latter may be moved longitudinally of the shaft against the action of the spring 48 to thereby release the frictional engagement of the drive pulley 46 and the fly wheel 43. A pressure switch 51 incorporated into the electrical circuit governing electric motor 39 and normally spring-urged in a closed circuit is arranged adjacent lever 49 to be actuated into an open circuit position when the lever 49 is urged against the action of the spring 48 to release the frictional engagement of the drive pulley 46 and drive wheel 43 thereby stopping the motor. It may be noted here that the other end 53 of the lever may be connected at one end of the spring 54 which is arranged to prevent inadvertent or accidental movement of the lever against the pressure plate 47 during the operation of the record player. A silken cord 59 is connected, through a spring 62, to one end 63 of the carriage 31, wrapped two or three times around drive pulley 46, carried beneath said carriage and around a sheave 65 which is also rotatably carried on a shaft 66 journalled for rotation on brackets 67 upstanding from the bottom 12 of the cabinet 11 connected to the other end 69 of the carriage. It will be seen that the action of the spring 62, which is a tension spring, will tend to tighten the silken cord 59 on the drive pulley 46 whereby upon rotation of the latter by the electric motor 39, the carriage will slide in the direction of the arrow shown T on FIGURE 1. A trip switch 70 in the electric circuit of the electric motor 39 is mounted on wall 14 of the cabinet and is arranged to lie in the path of the carriage to be tripped by the latter when the latter reaches a predetermined point, to open the circuit of the electric motor 39, to thereby halt the sliding movement of the carriage.

A tone arm 80 is pivotally mounted for vertical movement on the upper end 82 of a spindle 83, said spindle being journalled for rotation in suitable bearings mounted above an aperture 85 formed through the cover 18 of the chamber 19. The spindle 83 projects downwardly through the aperture into the chamber 19. Another trip switch 84 in circuit of motor 39 is mounted on cover 18 below the tone arm 80 and which is arranged to be tripped by the tone arm when the latter is lifted from the record to thereby open said circuit and stop the operation of the motor 39.

In the preferred form of the invention as shown in FIGURE 2, a mirror 87 is affixed to the lower end 88 of the spindle 83 for rotation therewith. The length of the tone arm 80, between its pivotal axis and a stylus 89 carried in the head 90 thereof, is such that the stylus, when the tone arm is disposed perpendicularly to the line of travel T of the carriage 31, will engage the record to be played on a line of radius of the turntable parallel to said line of travel T. In order to determine the proper point at which the stylus should engage the record so that the tone arm will lie perpendicularly to the direction of travel of the carriage, an electric light 91 is mounted on top of the wall 14 of the cabinet and is arranged by a suitable system of reflector and lens to issue a beam of light towards the pivotal axis of the tone arm and in a direction perpendicular to the direction of travel T of the carriage. The beam of light is reflected downwardly to impinge upon the record as a spot. The beam of light aforesaid is shown upon FIGURES 1 and 2 as a dashed line.

Having regard to the apparatus thus far described, it will be seen that the electric motor 39 when energized by an electric current will produce a shift of the carriage 31 in the direction T simultaneously with the lateral movement of the stylus inwardly towards the center of the record as the record is rotated by the turntable 36. If the groove spacing is uniform, the speed of lateral shift of the stylus and the speed of the lateral shift if the carriage may be synchronized by controlling the speed of the electric motor 39 by a manually variable resistor 92 which is shown in FIGURES 1, 7 and 8 and in the wiring diagram in FIGURE 9. In the cutting of records, however, groove spacing is not uniform, for example, the widely spaced unmodulated lead-in grooves between each selection on a long playing record. If the tone arm, therefore, were to be placed in a tangential position relative to the grooves in the record, with the stylus in the modulated groove, at the commencement of the record, it would not be in such a position at the end of play thereof. The apparatus is therefore provided with a second variable resistor means operable by pivotal movements of the tone arm out of its perfect tangential position to speed up the motor 39 and the corresponding speed of travel of the carriage 31 to thereby permit the tone arm to regain its said tangential position when the stylus reaches the modulated grooves again, where the groove spacing is uniform. Once the tangential position is reached, the second resistor means is actuated by the movement of the tone arm to again permit the electric motor 39 to slow down to its original speed which will simultaneously reduce the lateral shift of the carriage which has previously been synchronized to the lateral shift of the stylus relative to the record.

The second resistor means 94 is mounted within the chamber 19 and, as indicated in diagrammatic form in FIGURE 6, comprises a light dependent resistor or photo conductive-cell which is adapted to produce a degree of electrical resistance dependent upon the amount of light received by its light sensitive area. The resistor 94 is energized by a beam of light emanating from an electric light 95 also mounted within the chamber 19, the beam being arranged so that it is first reflected from the mirror 87 mounted on the end of the spindle 83. Interposed between the resistor 94 and the beam of light is a shield 98. The shield has a vertical slot 99 having vertical edges 100 and 101 formed through the base thereof, said slot lying on a line between the mirror 87 and the light sensitive area of the resistor 94. A diffusing lens 103 lies directly behind the slot 99 between the latter and the resistor 94, said lens being adapted to diffuse any light entering the slot over the entire light sensitive area of said resistor. The resistor 94 is connected into the circuit of electrical motor 39 as shown in FIGURE 9. The relative positioning of the mirror 87, the shield 98 and the resistor 94 is such that when the tone arm 80 is placed in its tangential position as aforesaid, the greater part of the light beam is directed such that only a relatively small width thereof finds its way through the slot 99 in the shield to be diffused by the lens 103 over the light sensitive area of the resistor 94 to thereby reduce the resistance of the resistor 94 to a predetermined degree. This is shown in FIGURE 6 of the drawings in which the greater part of the light beam is shown striking the shield 98 and only a small width thereof as indicated by the letter X being permitted to pass through the slot 99. It will be seen that if the tone arm should move out of its tangential position inwardly towards the center of the turntable, the mirror 87 will slightly rotate with the spindle, thereby changing the angle of reflection of the light and moving the beam more fully into the slot 99 so that more light finds its way therethrough and through the lens 103 onto the light sensitive area of the resistor 94 to decrease or reduce the resistance thereof and thereby increase the amount of current flow through the windings of the motor 39, said increase of current flow increasing the speed of the motor 39 and the corresponding speed of shift of the carriage. The reverse of the above takes place when the tone arm moves outwardly and away from the center of the turntable.

To measure, in terms of current flow the position assumed by the tone arm relative to its position tangential to the record, the record player is provided with a measuring means 104 as described following, and as shown in FIGURE 10. The measuring means comprises a light dependent resistor 105 and a manually variable resistor 106 which are arranged to vary the amount of electric current flow through the circuit 107, the light dependent resistor 105 being connected in series with a galvanometer 108 and in parallel with the variable resistor 106 as shown in FIGURE 10. The light dependent resistor 105 is positioned in much the same manner as light dependent resistor 94. In the preferred form, the light dependent resistor 105 is mounted vertically above light dependent resistor 94 behind shield 98 so that it receives the same beam of light received by said resistor 94 and is therefore actuated by the same variations of light received by the latter resistor. The amount of direct current flow through circuit 107 is measured by the meter 108 in said circuit, the scale 109 of which is calibrated in such a manner that it will measure the amount of current flow in degrees of deviation of the tone arm from its tangential position. The scale 109 is so marked that with the tone arm in its tangential position, the pointer 110 of the meter is centrally located with reference to the scale. Movement of the pointer one way or the other from said central position will therefore indicate the direction of deviation of the tone arm from its tangential position. In explanation of the foregoing, it should be noted that with the tone arm set in its tangential position, the resistance offered by the light dependent resistor 105 and the variable resistor 106 will permit a certain amount of current flow through circuit 107, said current flow being measured on scale 109 of the meter 108. The amount of this current flow may be adjusted by adjusting the variable resistor 106 so that the scale 109 of the meter 108 reads zero degrees deviation from the tangential position of the tone arm. Any movement of the tone arm which will cause a change in the resistance produced by the light dependent resistor 105 will change or vary the amount of current flow through the meter 108 which is, as hereinbefore stated, calibrated to indicate in terms of the degree of deviation of the tone arm from its tangential position. It should also be noted here that the variable resistor 92 is provided with a scale, the markings thereon being calibrated to correspond in degrees with the scale of meter 108. The operation of the resistor 92 in relation to meter 108 will be described hereinafter. It should also be noted that, if desired, a solar cell or photoelectric cell may be used in place of light dependent resistor 105.

In the operation of the record player 10, the clutch plate 47 is first disengaged from the drive pulley 46 and the carriage 31 positioned so that the tone arm 80 may be placed in a tangential position as aforesaid with the stylus lying within the light spot impinged on the record by the electric light 91. The variable resistor 92, which is also calibrated and marked relative to the rotational speed of each record, is adjusted so that the electric motor 39 will produce a lateral shift of the carriage in the direction T corresponding to the lateral shift of the stylus relative to the record as it follows the grooves therein, and the electric motor 37 adjusted by suitable controlling means also to the prescribed rotational speed of the record. The meter scale 109, provided the variable resistor 106 has been properly adjusted, will indicate that the tone arm is in its perfectly tangential position. As the record rotates, the stylus, following the grooves therein will begin to cover a path towards the center of rotation and simultaneously the carriage will begin its lateral shift in the direction T. Should the resistor 92 have been set exactly correctly and should the groove in the record be absolutely uniform in spacing, the tone arm will hold its tangential position without any movement. However, if due to any variation in groove spacing, the tone arm should tend to pivot out of its tangential position, the pivoting action of the mirror 87 and consequent shift of the light beam across the shield 98, will vary the amount of light received by the light dependent resistor thereby varying its resistance and thereby varying the total resistance in the circuit of the electric motor 39. This varying resistance will produce a corresponding variation in the speed of the shift of carriage 19, i.e. if the groove spacing has increased as between selections to tend to swing the tone arm inwardly towards the center of rotation of the record, the lateral shift of the carriage will also be speeded up to reduce the deviation of the tone arm from its perfect tangential position. When the stylus reaches the modulated groove at the beginning of the selection, where groove spacing is decreased to a uniform width, then the increased velocity of lateral shift of the carriage due to the action of the light dependent resistor while the stylus has been engaged in the wider groove spaced portion of the record between selections will carry the tone arm back to its tangential position. The tone arm will therefore have a constant hunting action during the course of the playing of the record, the deviation thereof from its perfect tangential position being dictated only by the speed and amplitude of the reaction of the light dependent resistor 94.

Groove spacing between modulated grooves is not standardized in all makes of records. It is, therefore, apparent that one setting of resistor 92 will not serve to sychronize the speed of lateral shift of the carriage to the lateral movement or shift of the stylus for every record. The tone arm might move to a position at something other than a tangential position during the travel of the stylus over the modulated grooves, which will consequently require further adjustment of resistor 92. The scale 109 of meter 108 and markings of resistor 92 are correlatedly calibrated, as hereinbefore described so that if the former should show a deviation of the tone arm, say 3°, one way or the other from its tangential position the speed of travel of the carriage may be adjusted to bring the tone arm to its tangential position by adjusting the resistor 92, in accordance with its calibrated markings for a 3° shift in the same direction as indicated by the meter 108. It might also be noted here that the resistance as produced by the light dependent resistor 94, may be used in varied ways by those versed in the art. The invention, therefore, is not limited to the arrangement of the parts as shown, FIGURE 9 showing only one form of an electric circuit.

Figure 4:
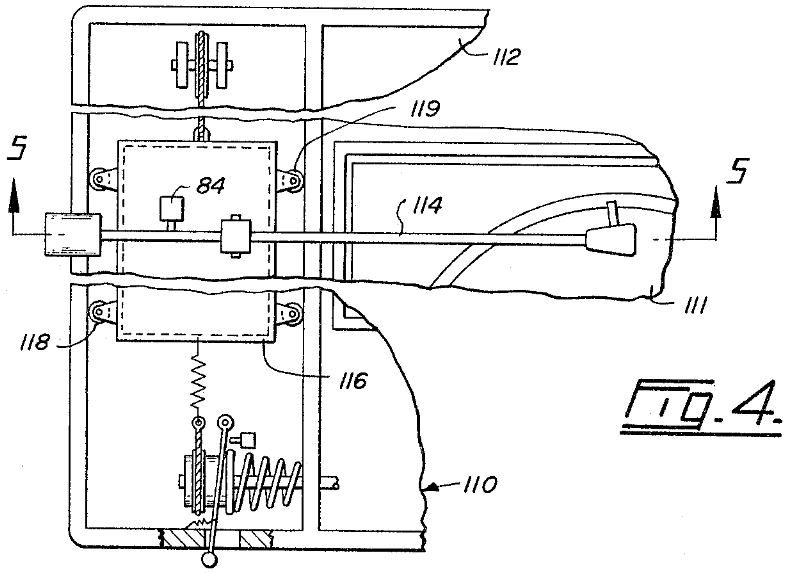
FIGURE 4 is a fragmentary plan view of an alternate form of the invention.
Figure 5:
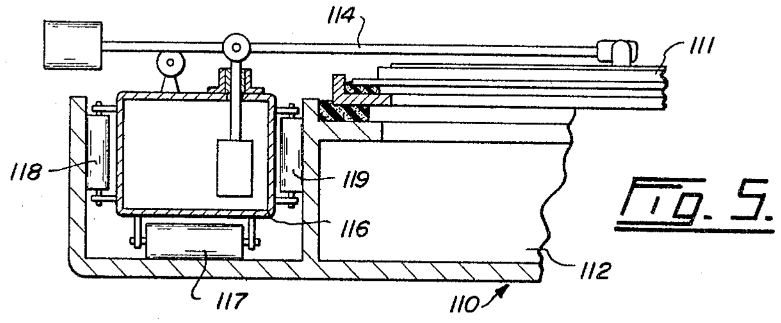
FIGURE 5 is a section taken along line 5—5 of FIGURE 4.

FIGURES 4 and 5 show an alternate form of record player 110. Record player 110 differs from record player 10 in that the turntable 111 is pivotally mounted for rotation relative to the cabinet 112 and the tone arm 114 is pivotally mounted on a movable carriage 116, which is supported on rollers 117 and provided with lateral guidance by rollers 118 and 119. The carriage 116 comprises elongated substantially rectangular box-like structure upon which the tone arm 114 is mounted in exactly the same manner as tone arm 80 is mounted on the cover 18 of record player 10. A light dependent resistor, not shown, and electric light are carried within the carriage in substantially the same manner as their counterparts are secured within the chamber 19 of record player 10. The operation of record player 110 is exactly the same as the operation of record player 10.

It will be apparent to those versed in the mechanical art, that various means may be devised to utilize the pivotal movement of the tone arm as hereinbefore described, to vary the amount of light beamed upon the light sensitive surface of the photo-conductive cell or light dependent resistor in order to vary the resistance to an electrical current produced by the latter. One of the means which may be employed is shown in FIGURES 7 and 8 which show in diagrammatic form, the arrangement of the various components of the apparatus, as hereinafter described. Wherever possible, reference will be made to reference characters as shown in FIGURES 1, 2 and 3 in order to simplify the description.

As shown in FIGURES 7 and 8, the light dependent resistor 130 and diffusion lens 131 are mounted within chamber 19 on one side of a vertically disposed arcuate shield 133 which is connected to one end 134 of a horizontal arm 136, the other end 137 of the arm being fixedly connected to the lower end 88 of the spindle 83. An electric light 139 is arranged on the other side of the arcuate shield 133 to project a beam of light through the lens 131 and on to the light sensitive surface of the light dependent resistor 130. The shield 133 is positioned so that when the tone arm 80 is disposed in its tangential position, the shield 133 lies partially within the path of the beam emanating from the electric light 139 to permit only a portion of said beam to strike the lens 131 to thereby limit or determine the resistance to electric current produced by the light dependent resistor to the predetermined level produced by mirror 87 and slotted shield 98 arrangement of parts hereinbefore described. It will be seen that pivotal movement of the tone arm 80 will tend to swing the arcuate shield 133 one way or the other thereby varying the amount of light to be received by the light sensitive surface of the light dependent resistor 130 in somewhat the same manner as achieved by the mirror and slotted shield arrangement hereinbefore described. It will be understood that the arrangement of parts to utilize the resistance produced by resistor 130 is substantially the same as hereinbefore described.

What I claim as my invention is:

1. A record player for playing spirally grooved records comprising a rotatable record-carrying member, a stylus carrying pivotally mounted arm member normally extending substantially tangentially to the record-carrying member, one of said members being horizontally slidable relative the other in a direction perpendicular to the arm member when the latter is in its normal position, an electric motor in an electric circuit operably connected to the slidable member to move the latter in said direction, a manually adjustable variable first resistor means in said circuit operable to govern the speed of the electric motor to synchronize the lateral shift of the slidable member to the shift of the arm member as a result of lateral movement of the stylus relative to the record and a second variable resistor means in said circuit and co-operating with the first resistor means, operably responsive to pivotal movements of the arm member as a result of variations in spacing of the spiral groove in the record to vary the total resistance in said circuit as the arm member tends to shift from its normal position to retain the latter in said normal position.

2. A record player as claimed in claim 1 including means to align the arm member in its normal position.

3. A record player as claimed in claim 2 in which said means comprises a source of light arranged to focus a beam of light as a spot onto the record, said source of light being arranged to indicate the point of engagement of the stylus and the record to position the arm in its normal tangential position.

4. A record player as claimed in claim 1 in which the second resistor means comprises a light dependent variable resistor, a mirror mounted on the arm member for pivotal movement therewith, a source of light arranged to focus a beam of light on the mirror, said mirror being arranged to reflect said beam of light to the light dependent resistor whereby pivotal movement of the mirror will tend to alter the direction of the reflected light beam relative to the resistor to thereby vary the resistance of the latter.

5. A record player as claimed in claim 1 in which the second resistor means comprises a light dependent variable resistor, a source of light arranged to project a beam of light on to the former, and a shield connected to the arm member interposable into the path of the beam of light upon pivotal movement of said arm member to thereby vary the amount of light projected onto the resistor to thereby vary the resistance produced by said resistor.

6. A record player as claimed in claim 1 including measuring means operably responsive to pivotal movements of the arm member as a result of variations in spacing of the spiral groove to indicate the deviation of said arm member from its normal position.

7. A record player for playing spirally grooved records comprising a base, a carriage slidably mounted for horizontal movement of the base, a turntable mounted for rotation on the carriage, a stylus carrying tone arm pivotally mounted on the base and normally extending substantially tangentially to the turntable, an electric motor in an electric circuit operatively connected to the carriage to move the latter in a direction perpendicular to the tone arm when said tone arm is disposed in its normal position, first resistor means in said circuit manually adjustable to vary the resistance to govern the speed of the electric motor to thereby synchronize the lateral shift of the carriage to the shift of the tone arm as a result of the lateral movement of the stylus across the record, second resistor means co-operating with the first resistor means and operably responsive to pivotal movements of the tone arm as a result of variation in spacing of the spiral groove in the record to vary the total resistance in said circuit as the tone arm tends to shift from the normal position to maintain the latter in said normal position.

8. A record player as claimed in claim 7 including means to align the tone arm in its normal position.

9. A record player as claimed in claim 7 in which the second resistor means comprises a light dependent variable resistor, a mirror mounted on the tone arm for pivotal movement therewith, a source of light arranged to focus a beam of light on the mirror, said mirror being arranged to reflect said beam of light to the light sensitive resistor whereby pivotal movement of the mirror will tend to alter the direction of the reflected light beam relative to the resistor to thereby vary the resistance of the latter.

10. A record player as claimed in claim 7 in which the second resistor means comprises a light dependent variable resistor, a source of light arranged to project a beam of light onto the former, and a shield connected to the tone arm interposable into the path of the beam of light upon pivotal movement of said tone arm to thereby vary the amount of light projected onto the resistor to thereby vary the resistance produced by the said resistor.

11. A record player as claimed in claim 7 including measuring means operably responsive to pivotal movements of the tone arm as a result of variations in spacing of the spiral groove to indicate the deviation of said tone arm from its normal position.

12. A record player for playing spirally grooved records comprising a base, a turntable mounted for rotation on the base, a carriage slidably mounted on the base for horizontal movement, a tone arm pivotally mounted on the carriage and normally extending substantially tangentially to the turntable and at right angles to the direction of movement of the carriage, an electric motor in an electric circuit operatively connected to the carriage to move the latter in a direction perpendicular to the tone arm when said tone arm is disposed in its normal position, first resistor means in said circuit manually variable to govern the speed of the electric motor to thereby synchronize the lateral shift of the carriage to the shift of the tone arm as a result of the lateral movement of the stylus second variable resistor means co-operating with the first resistor means and operably responsive to pivotal movements of the tone arm as a result of variation in spacing of the spiral groove in the record to vary the total resistance in said circuit as the tone arm tends to shift from the normal position to maintain the latter in said normal position.

13. A record player as claimed in claim 12 including means to align the tone arm in its normal position.

14. A record player as claimed in claim 12 in which the second resistor means comprises a light sensitive variable resistor, a mirror mounted on the tone arm for pivotal movement therewith, a source of light arranged to focus a beam of light on the mirror, said mirror being arranged to reflect said beam of light to the light dependent resistor whereby pivotal movement of the mirror will tend to alter the direction of the reflected light beam relative to the resistor to thereby vary the resistance of the latter.

15. A record player as claimed in claim 12 in which the second resistor means comprises a light dependent resistor, a source of light arranged to project a beam of light onto the former, and a shield connected to the tone arm interposable onto the path of the beam of light upon pivotal movement of said tone arm to thereby vary the amount of light projected on the resistor to thereby vary the resistance produced by the said resistor.

16. A record player as claimed in claim 12 including measuring means operably responsive to pivotal movements of the tone arm as a result of variations in spacing of the spiral groove to indicate the deviation of said tone arm from its normal position.

References Cited by the Examiner

UNITED STATES PATENTS

| | | | |
|---|---|---|---|
| 2,479,640 | 8/1949 | Rieber | 274—13 X |
| 3,129,946 | 4/1964 | Rabinow | 274—23 |

NORTON ANSHER, *Primary Examiner.*

CLIFFORD B. PRICE, *Assistant Examiner.*